May 1, 1923.

R. J. BALAZS ET AL 1,453,614

CUSHIONED VEHICLE WHEEL

Filed Oct. 14, 1920

R. J. Balazs
H. S. Autrey

INVENTORS

BY

ATTORNEYS

May 1, 1923.
R. J. BALAZS ET AL
1,453,614
CUSHIONED VEHICLE WHEEL
Filed Oct. 14, 1920
3 Sheets-Sheet 2
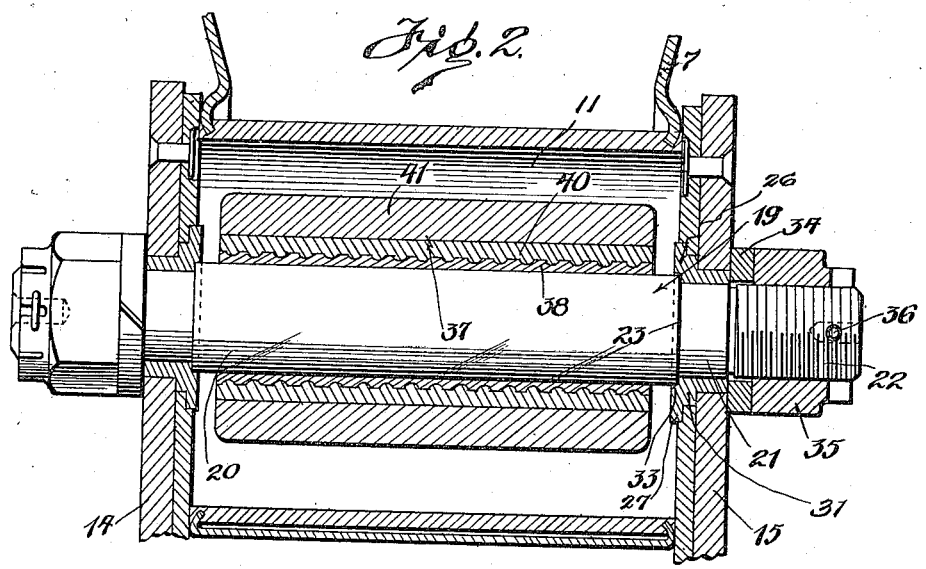
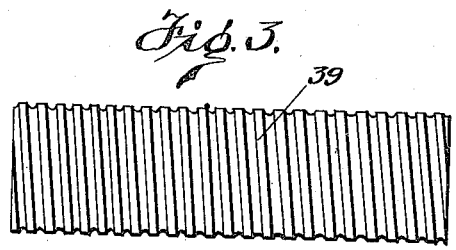
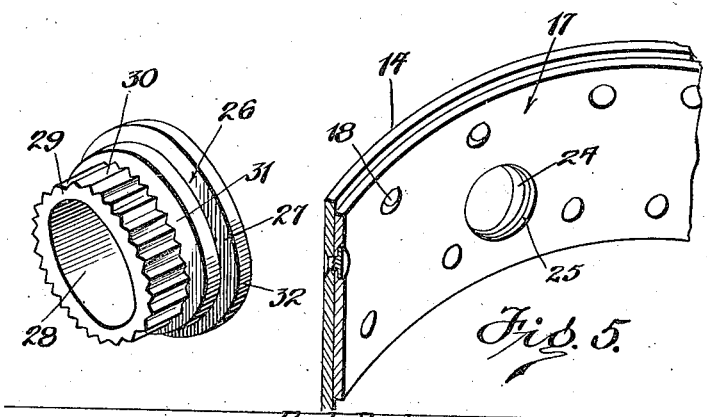
R. J. Balazs
H. S. Autrey.
INVENTOR.
BY
ATTORNEYS Patented May 1, 1923.

1,453,614

UNITED STATES PATENT OFFICE.

RUDOLPH J. BALAZS AND HERBERT S. AUTREY, OF CLEVELAND, OHIO, ASSIGNORS TO HOUSTON PNEUMATIC PUNCTURE PROOF WHEEL COMPANY, OF HOUSTON, TEXAS, A CORPORATION OF TEXAS.

CUSHIONED VEHICLE WHEEL.

Application filed October 14, 1920. Serial No. 417,006.

*To all whom it may concern:*

Be it known that we, RUDOLPH J. BALAZS and HERBERT S. AUTREY, citizens of the United States, residing at Cleveland, in the county of Cuyahoga and State of Ohio, have invented certain new and useful Improvements in Cushioned Vehicle Wheels, of which the following is a specification.

This invention relates to improvements in cushioned vehicle wheels and more particularly that type comprising a hub, a floating rim, a cushion interposed between the hub and the rim and supporting the latter, and driving connection between the hub and rim, The general object of the invention is to improve the driving connection referred to above.

The driving connection comprises a plurality of buffer members which extend between the face plates supported upon the hub and which operate within and coact with the walls of buffer sleeves which are arranged at intervals in the circumference of the floating rim, and one of the more specific objects of the invention is to improve the construction of the buffer member so that the same will perform its functions in the most efficient manner and will be of durable construction so that frequent replacement will not be necessary.

Each of the buffer members comprises a spindle upon which is freely and rotatably mounted a sleeve of anti-friction metal carrying a soft rubber cylindrical body which is to coact directly with the wall of the respective buffer sleeve upon the floating rim, and another object of the invention is to provide novel means for securing the soft rubber body upon the said sleeve of anti-friction metal so as to effect a permanent and secure union between these parts.

The spindles of the buffer members above referred to are mounted at their ends in the face plates previously mentioned, and a further object of the invention is to provide a novel means for mounting the ends of the spindles in these plates in such manner as to provide for a bearing surface of maximum area and thus produce a more durable and secure structure.

As indicated above the rim is supported by the cushion member in such manner that it may float between the face plates, and a further object of the invention is to provide novel means for reducing friction between these parts and for taking up shocks incident to side thrust of the rim against the plates.

In the accompanying drawings:

Figure 2 is a detail longitudinal sectional view through the driving connection embodying the invention;

Figure 3 is a side elevation of the sleeve of anti-friction metal which is mounted upon the spindle and which comprises a part of the buffer member of the driving connection;

Figure 4 is a perspective view of one of the bushings employed in mounting the ends of the spindles above referred to;

Figure 5 is a perspective view of a portion of one of the face plates;

Figure 1:
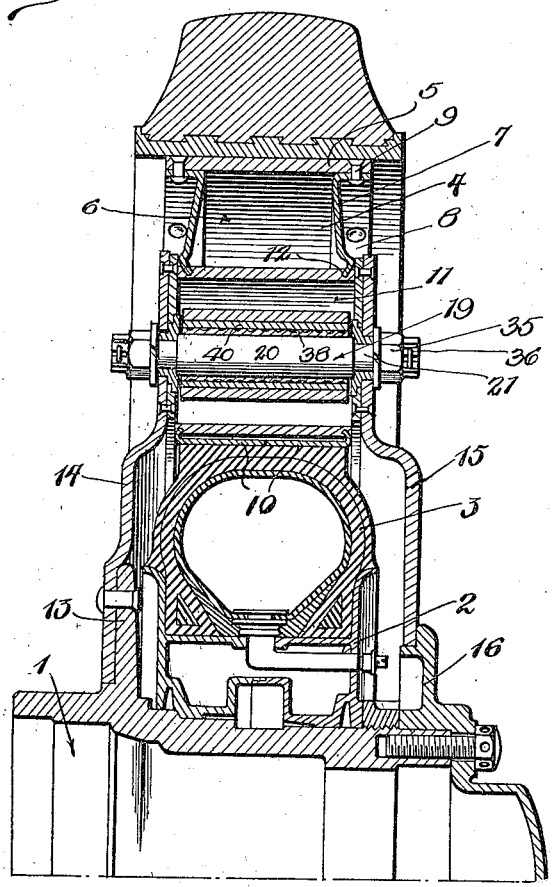
Figure 1 is a detail diametric sectional view through approximately one-half of a wheel constructed in accordance with this invention.
Figure 6:
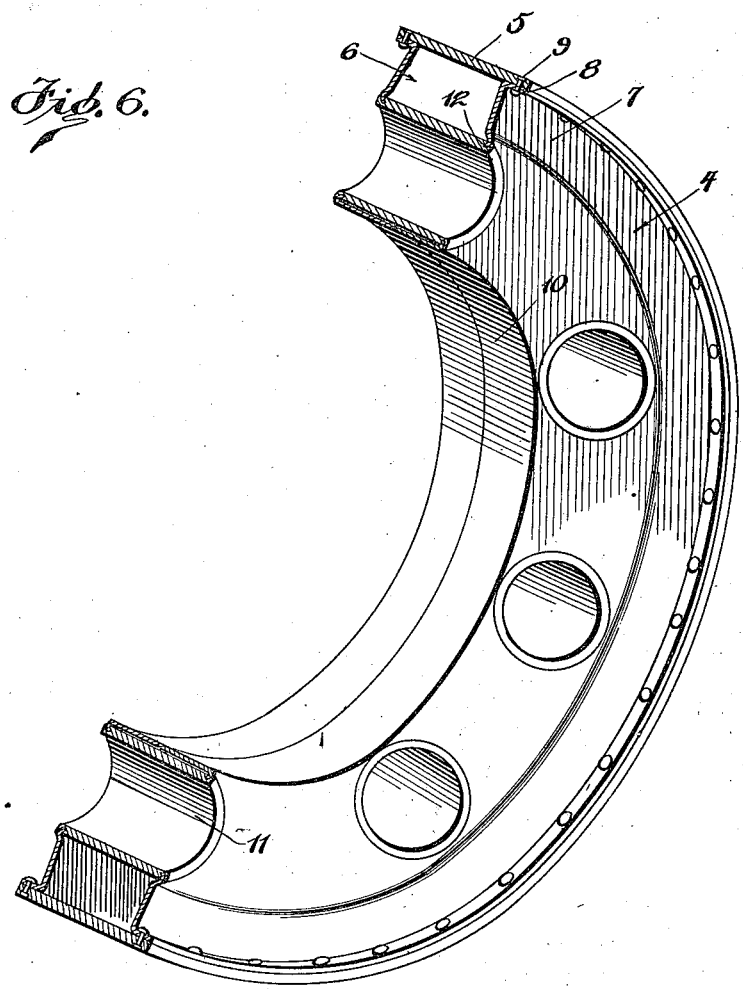
Figure 6 is a sectional view illustrating substantially half of the floating rim.

In the drawings, the numeral 1 indicates in general the hub of the wheel, the numeral 2 indicates the seating member which is mounted for free rotative movement upon the hub, the numeral 3 indicates the pneumatic cushion which is mounted upon and supported by the seating member, and the numeral 4 indicates in general the floating rim which is supported upon the pneumatic cushion 3. All of these parts form the subject matter of co-pending applications filed by us Oct. 14, 1920, Serial Nos. 417,007 and 417,005, and hence no specific description need be given herein with the possible exception of the floating rim, the construction of which will now be described.

The rim above referred to comprises an outer member which is indicated by the numeral 5 and which is in the form of an annular band. The rim further comprises an inner member consisting of sections 6 each of which comprises an annular web or body 7 having an outer peripheral flange 8 riveted or otherwise secured as at 9 to the inner side of the rim 5. The body 7 of each section of the inner member of the rim is further provided at its inner peripheral edge with an inwardly projecting flange 10, and these flanges meet at their edges as clearly shown in the drawings and provide a cylindrical bearing surface for the correspondingly formed outer surface of the casing of the pneumatic cushion 3. At intervals in its circumference, the floating rim 4 is provided with buffer sleeves 11 which are of cylindrical form and are seated at their ends in oppositely located openings in the web-like body portions 7 of the sections 6 of the inner member of the rim, the walls of the openings being preferably permanently pressed into grooves 12 formed in the outer surface of the sleeves at the ends thereof so as to permanently unite the parts.

The hub 1 is formed near its inner end with a radial circumscribing flange 13 to which is riveted or otherwise secured the inner face plate of the wheel indicated by the numeral 14. The outer face plate of the wheel is indicated by the numeral 15 and the same may be supported upon the hub in any suitable manner as for example by a connection established with the hub cap 16 fitted onto the outer end of the hub. The face plates 14 and 15 have their outer peripheral portions lying at opposite sides of the floating rim 4 as most clearly shown in Figures 1 and 2 of the drawing, and in order that friction between the inner faces of the face plates and the outer faces of the rim may be reduced to a minimum, and further in order that side thrust imposed upon the rim may be absorbed, each face plate is provided with a thrust ring indicated in general by the numeral 17. This ring comprises an annular flat body which is disposed against the inner face of the respective face plate near the outer periphery thereof as most clearly shown in Figures 1, 2 and 5 of the drawings and is secured in place as for example by rivets. The thrust rings 17 for the two face plates may be of any material found suitable for the purpose and for example, woven material such as is employed in lining brake bands, may be used in this connection.

As pointed out, buffer members are provided and are mounted upon spindles supported at their ends by the face plates and extending through the sleeves of the floating rim, and the construction of these buffer members and of the spindles and the manner of mounting the spindles will now be described.

The spindles above referred to are each indicated by the numeral 19 and the same has a cylindrical intermediate portion 20 which is reduced at its ends to provide smooth cylindrical portions 21 and beyond the portions 21 is threaded as at 22. In forming the reduced end portions 21, circumscribing shoulders 23 are provided at the ends of the cylindrical intermediate portion 20 of the spindle. By reference to Figures 1, 2 and 5 of the drawings, it will be observed that the face plates 14 and 15 are formed, at the points of location of the buffer members, with openings 24, and that the thrust rings 17 are at these points formed with similar openings 25 concentric to the openings 24 and of slightly greater diameter so that the portion of the face of each face plate surrounding the opening 24 therein and in turn bounded by the respective opening 25 in the thrust ring 17, is exposed.

In order that the reduced ends of the spindles may be suitably mounted through the openings 24 in the face plates and afforded a bearing surface of maximum area, these portions of the spindles are seated in bushings which are in turn seated within the said openings 24. These bushings are indicated in general by the numeral 26 and one of them is most clearly shown in perspective in Figure 4 of the drawings. This bushing comprises a body 27 having a smooth cylindrical bore 28 of a diameter to snugly receive the reduced portion 21 of the respective spindle, and the body of the bushing is exteriorly reduced in diameter at one end as at 29 and is formed with a circumferential series of corrugations 30 which extend parallel to the axis of the bushing and which are relatively sharp edged. In reducing this end of the bushing, a shoulder 31 is formed, and in fitting the bushing into place within the respective opening 24, the reduced corrugated end of the bushing is driven or forced in the opening until the shoulder 31 seats firmly against the exposed portion of the inner face of the respective face plate, which exposed portion is bounded by the opening 25 in the thrust ring 17 as previously pointed out. In forcing or driving the bushing into the opening 24, the corrugations 30 will bite into the wall of this opening, and in this manner the bushing will be securely held within the opening and also prevented from rotation. Immediately adjacent the shoulder 31, the bushing is exteriorly of a diameter to fit more or less snugly within the opening 25 in the thrust ring 17, and the bushing is provided with a circumscribing peripheral flange 32 which, when the bushing is driven into place, will become partially embedded in the face of the thrust ring 17 surrounding the opening 25 and will therefore firmly grip or bind this portion of the ring against the face of the respective plate 14 or 15 as the case may be. When the spindle 19 is assembled with the face plates by fitting these reduced end portions 21 into the bushings designed for their reception, the shoulders 23 of the spindle will be brought to bear against the end faces of the bushings adjacent which the flanges 32 are located and if desired these faces of the bushings may be slightly depressed or countersunk as indicated by the numeral 33. After assembling the parts in the manner stated lock washers 34 are fitted onto the ends of the spindles which project beyond the faces of the face plates 14 and 15, and nuts 35, preferably of the castellated type, are threaded onto the threaded ends 22 of the spindles and tightened against the said washers 34, the usual cotter pins 36 being fitted through the said threaded ends of the spindles to engage in the notches formed in the outer ends of the nuts. Of course when the nuts 35 are tightened, the shoulders 23 of the spindles will be caused to bind firmly against the inner faces of the bushings 26, and in this manner the parts are securely and firmly held together and at the same time the face plates 14 and 15 are maintained in proper spaced relation.

The buffer member which is mounted upon each spindle 19 is indicated in general by the numeral 37 and comprises a sleeve 38 of any suitable anti-friction metal having a cylindrical bore of a diameter to adapt the sleeve to freely and rotatably fit the intermediate portion 20 of the respective spindle. Exteriorly the sleeve 38 is corrugated circumferentially as indicated by the numeral 39 and the sleeve may be formed with helically extending corrugations, as illustrated in the drawings. The numeral 40 indicates a sleeve of hard rubber which is vulcanized onto the sleeve 38 and encompasses the same and in vulcanizing this sleeve 40 in place, the hard rubber of which it is formed will enter between the corrugations 39 so in the final product the said sleeve 40 will be securely and permanently united with the sleeve 38. The buffer member is completed by an outer sleeve 41 which is of soft rubber and which is vulcanized onto the sleeve 40. This sleeve 41 is of a diameter less than the interior diameter of the buffer sleeve 11 within which it works and it will be understood that as the rim of the wheel yields through the weight imposed upon the wheel or through impacts with the road surface, or under driving conditions, the sleeves 41 of the several buffers will coact with the sleeves 11 so as to establish driving connection between the hub of the wheel and the said floating rim. Due to the fact that the sleeve 38 is freely rotatable upon the spindle 19, constantly changing portions of the surfaces of the several sleeves 41 will be brought into engagement with the walls of the sleeves 11 so that no one portion of any sleeve 37 will be subjected to excessive wear or impact.

Having thus described the invention, what is claimed as new is:

1. In a vehicle wheel, a hub, face plates carried by the hub, a floating rim cushioned with relation to the hub and movable between the face plates, buffer members carried by the said rim, the face plates being formed with openings, bushings having circumferentially roughened portions fitted in the openings and held against rotation by the coaction of their roughened portions with the walls of the openings, spindles seated at their ends in the bushings, and buffers mounted upon the spindles and coacting with the buffer members of the rim.

2. In a vehicle wheel, a hub, face plates carried by the hub, a floating rim cushioned with relation to the hub and movable between the face plates, buffer members carried by said rim, the face plates being formed with openings, bushings each having a circumferential shoulder and a circumferentially corrugated portion, the bushings being forcibly fitted into the openings with their corrugated portions having biting engagement with the walls of the openings and with their shoulders seating against the inner faces of the face plates, spindles seated at their ends in the bushings, and buffers mounted upon the spindles and coacting with the buffer members of the rim.

3. In a vehicle wheel, a hub, face plates carried by the hub, a floating rim cushioned with relation to the hub and movable between the face plates, buffer members carried by the said rim, the face plates being formed with openings, bushings having portions fitting within the openings, the said portions being formed with a circumscribing series of corrugations having biting engagement with the walls of the openings, the bushings having shoulders engaging the inner faces of the face plates, spindles fitted at their ends in the bushings, and having shoulders engaging the inner ends of the bushings, nuts threaded onto the ends of the spindles and bearing against the outer faces of the face plates, and buffers upon the spindles coacting with the buffer members of the rim.

4. In a vehicle wheel, a hub, face plates carried by the hub, a floating rim cushioned with relation to the hub and movable between the face plates, thrust members disposed against the inner faces of the face plates and between the same and the sides of the floating rim, the face plates and thrust members being formed with openings, buffer members carried by the rim, bushings seated in the openings in the face plates and thrust members and binding the thrust members to the face plates, spindles seated at their ends in the bushings, and buffers upon the spindles coacting with the buffer members of the rim.

5. In a vehicle wheel, a hub, face plates carried by the hub, a floating rim cushioned with relation to the hub and movable between the face plates, buffer members carried by the said rim, thrust members of anti-friction material disposed against the inner faces of the face plates and between the same and the sides of the floating rim, the said face plates and thrust members being formed with openings, bushings having portions seated in the openings in the face plates and having shouldered portions seated in the openings in the thrust members and against the inner faces of the face plates, the bushings having flanges binding the portions of the thrust member surrounding the openings therein, spindles fitted at their ends in the bushings and having shoulders engaging said bushings, nuts threaded onto the ends of the spindles and exerting pressure on the outer faces of the face plates, and buffers mounted upon the spindles and coacting with the buffer members of the rim.

6. A buffer for wheels of the class described comprising a bearing sleeve provided exteriorly with helically extending corrugations, a sleeve of relatively hard rubber vulcanized to the exterior of the first mentioned sleeve, and a sleeve of soft rubber surrounding the sleeve of hard rubber.

In testimony whereof we affix our signatures.

RUDOLPH J. BALAZS. [L. s.]
HERBERT S. AUTREY. [L. s.]